(12) United States Patent
Zhao

(10) Patent No.: US 9,794,077 B2
(45) Date of Patent: Oct. 17, 2017

(54) CONTROL METHOD, DEVICE AND OPTICAL TRANSCEIVER

(71) Applicant: ZTE Corporation, Shenzhen, Guangdong (CN)

(72) Inventor: Lu Zhao, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 14/904,164

(22) PCT Filed: Jun. 25, 2014

(86) PCT No.: PCT/CN2014/080752
§ 371 (c)(1),
(2) Date: Jan. 11, 2016

(87) PCT Pub. No.: WO2015/007140
PCT Pub. Date: Jan. 22, 2015

(65) Prior Publication Data
US 2016/0156478 A1  Jun. 2, 2016

(30) Foreign Application Priority Data
Jul. 19, 2013 (CN) .......................... 2013 1 0307041

(51) Int. Cl.
*H04J 14/00* (2006.01)
*H04L 12/12* (2006.01)
(Continued)

(52) U.S. Cl.
CPC .............. *H04L 12/12* (2013.01); *H04B 10/40* (2013.01); *H04Q 11/0005* (2013.01); *H04Q 2011/0039* (2013.01)

(58) Field of Classification Search
CPC ......... H04L 12/12; H04L 49/25; H04B 10/40; H04B 10/0775; H04B 10/272;
(Continued)

(56) References Cited

U.S. PATENT DOCUMENTS 8,050,284 B2 * 11/2011 Zhao ..................... H04L 47/10
370/395.7
8,498,534 B2  7/2013 Hirth
(Continued)

FOREIGN PATENT DOCUMENTS

CN     101969584 A   2/2011
CN     102204131 A   9/2011
(Continued)

OTHER PUBLICATIONS

International Search Report in international application No. PCT/CN2014/080752, mailed on Sep. 30, 2014, 2 pgs.
(Continued)

*Primary Examiner* — Hibret Woldekidan
(74) *Attorney, Agent, or Firm* — Cooper Legal Group, LLC

(57) ABSTRACT

A control method and device, and an optical transceiver are described in an embodiment of the disclosure. A first optical processing device is connected with a second optical processing device through an optical port link, and a transmission module configured to transmit a signal to the second optical processing device through the optical port link is arranged on the first optical processing device. The method includes: judging whether there is data to be transmitted to the second optical processing device or not in the first optical processing device, and acquiring a judgment result; and controlling the transmission module to be in an off state when the judgment result is NO.

16 Claims, 4 Drawing Sheets

(51) Int. Cl.
*H04B 10/40* (2013.01)
*H04Q 11/00* (2006.01)

(58) Field of Classification Search
CPC ....... H04Q 11/0005; H04Q 2011/0039; H04Q 2011/0041; H04Q 11/0001; H04Q 2011/0052; H04Q 2011/0064; H04J 14/0221; H04J 14/0212; H04J 14/0267
USPC .................. 398/45, 48, 49, 51, 52, 135, 139
See application file for complete search history.

(56) References Cited

U.S. PATENT DOCUMENTS

| | | | | |
|---|---|---|---|---|
| 8,521,030 | B2* | 8/2013 | Aoki | H04B 10/40 398/135 |
| 8,744,261 | B2* | 6/2014 | Hirth | H04B 10/27 398/25 |
| 8,902,488 | B2* | 12/2014 | Graham | H04Q 11/0005 359/276 |
| 9,148,264 | B2* | 9/2015 | Hou | H04L 1/18 |
| 2010/0111523 | A1* | 5/2010 | Hirth | H04B 10/27 398/25 |
| 2012/0020675 | A1* | 1/2012 | Chuang | H04B 10/40 398/193 |
| 2013/0034355 | A1* | 2/2013 | Zhang | H04Q 11/0067 398/67 |
| 2013/0294775 | A1 | 11/2013 | Hirth et al. | |
| 2014/0133843 | A1* | 5/2014 | Kim | H04B 10/272 398/9 |
| 2015/0139647 | A1* | 5/2015 | Soto | H04B 10/2503 398/58 |
| 2017/0078021 | A1* | 3/2017 | Zhang | H04B 10/2504 |

FOREIGN PATENT DOCUMENTS

| | | |
|---|---|---|
| CN | 102404047 A | 4/2012 |
| JP | 2011114651 A | 6/2011 |

OTHER PUBLICATIONS

English Translation of the Written Opinion of the International Search Authority in international application No. PCT/CN2014/080752, mailed on Sep. 30, 2014, 5 pgs.

Supplementary European Search Report in European application No. 14826981.4, mailed on Jul. 1, 2016, 8 pgs.

* cited by examiner

When DELAY_TIMER is 0, a TX_DISABLE
Signal is Switched, and an I code stream or
a C code stream is transmitted

CONTROL METHOD, DEVICE AND OPTICAL TRANSCEIVER

TECHNICAL FIELD

The disclosure relates to the field of communications, and in particular to a control method, a control device, and an optical transceiver.

BACKGROUND

An existing high-efficiency low-energy-consumption Ethernet standard implemented by an electric port auto-negotiation mechanism-based Institute of Electrical and Electronic Engineers (IEEE) 802.3az protocol is called Energy Efficient Ethernet (EEE). EEE includes cooperative work of a Media Access Control (MAC) chip and a Physical (PHY) chip, and the PHY chip enters a low power mode when an online load is lighter. The low power mode may independently run in a receiving direction and a transmission direction, and a part of temporarily unnecessary functional circuits are switched off to fulfil the aim of reducing power consumption.

In order to implement EEE without influence on a basic message forwarding function of the Ethernet, it is necessary to keep a port entering a low power mode and a link state of an opposite port unchanged. Moreover, when the port enters or quits the low power mode, message loss or damage is not allowed.

SUMMARY

In order to solve the existing technical problem, an embodiment of the disclosure provides a control method, a control device, and an optical transceiver.

An embodiment of the disclosure provides a control method, a first optical processing device being connected with a second optical processing device through an optical port link and a transmission module configured to transmit a signal to the second optical processing device through the optical port link being arranged on the first optical processing device, the method including:

judging whether there is data to be transmitted to the second optical processing device or not in the first optical processing device, and acquiring a judgment result; and controlling the transmission module to be in an off state when the judgment result is NO.

In the solution, the method may further include:

controlling the transmission module to be in an on state to enable the transmission module to transmit the data to the second optical processing device when the judgment result is YES.

In the solution, before controlling the transmission module to be in the off state, the method may further include:

controlling the transmission module to transmit a first code stream configured to maintain a signal transmission channel on the optical port link to the second optical processing device, and setting a timer;

correspondingly, the method may further include:

at end of timing of the timer, controlling the transmission module to be switched on, controlling the switched-on transmission module to transmit a second code stream configured to maintain the signal transmission channel to the second optical processing device, and continuing judging whether there is the data to be transmitted to the second optical processing device or not in the first optical processing device.

In the solution, there may exist a calculation relationship between a time length of the timer and first delay time, wherein the first delay time may be delay time of transmission of the first code stream to the second optical processing device by the transmission module relative to transmission of a third code stream to the second optical processing device by the transmission module, the third code stream may be a code stream which is transmitted to the second optical processing device last time before the transmission module transmits the first code stream to the second optical processing device, and the third code stream may be configured to establish or maintain the signal transmission channel; and the method may further include:

when the second optical processing device does not receive the second code stream within second delay time after receiving the first code stream, setting the signal transmission channel to be unavailable, wherein there exists a calculation relationship between the second delay time and third delay time, and the third delay time is delay time of reception of the first code stream by the second optical processing device relative to reception of the third code stream by the second optical processing device.

In the solution, the calculation relationship may be an N-fold relationship, wherein N may be greater than 1.

In the solution, a receiving module configured to receive a signal transmitted by the second optical processing device through the optical port link is also arranged on the first optical processing device, and the method may further include:

when the receiving module does not receive a code stream configured to maintain a signal receiving channel from the second optical processing device within delay time after receiving a fourth code stream configured to maintain the signal receiving channel on the optical port link from the second optical processing device, controlling a state machine of the signal receiving channel to be in a channel-unavailable state; or, when the receiving module receives a fifth code stream configured to maintain the signal receiving channel on the optical port link from the second optical processing device, controlling the state machine of the signal receiving channel to be in a channel-available state.

An embodiment of the disclosure further provides a control device, a first optical processing device is connected with a second optical processing device through an optical port link, and a transmission module configured to transmit a signal to the second optical processing module through the optical port link is arranged on the first optical processing device, the device includes:

a judgment module, configured to judge whether there is data to be transmitted to the second optical processing device or not in the first optical processing device, and acquire a judgment result; and a first control module, configured to control the transmission module to be in an off state when the judgment result is NO.

In the solution, the device may further include:

a second control module, configured to control the transmission module to be in an on state to enable the transmission module to transmit the data to the second optical processing device when the judgment result is YES.

In the solution, the device may further include:

a third control module, configured to control the transmission module to transmit a first code stream configured to maintain a signal transmission channel on the optical port link to the second optical processing device when the judgment result is NO, and trigger the first control module after setting a timer, correspondingly, the first control module 72 is further configured to control the transmission module to be in the off state after being triggered by the third control module; and a fourth control module, configured to, at end of timing of the timer, control the transmission module to be switched on, control the switched-on transmission module to transmit a second code stream configured to maintain the signal transmission channel to the second optical processing device, and trigger the judgment module 71, correspondingly, the judgment module 71 is further configured to continue judging whether there is the data to be transmitted to the second optical processing device or not in the first optical processing device and acquire a judgment result after being triggered by the fourth control module.

An embodiment of the disclosure further provides an optical transceiver, which may include the abovementioned control device.

An embodiment of the disclosure further provides a computer storage medium, which may include a set of instructions and cause at least one processor to execute the abovementioned control method when the instructions are executed.

From the above, the embodiment of the disclosure at least has the following beneficial effects:

obviously, the transmission module is controlled to be in the off state when there is no data to be transmitted to the second optical processing device in the first optical processing device, so that energy consumption of the first optical processing device is reduced.

BRIEF DESCRIPTION OF THE DRAWINGS

In the drawings (which may not be drawn to scale), similar reference signs may describe similar parts in different views. Similar reference signs with different suffix letters may represent different examples of similar parts. The drawings generally show each embodiment discussed in the disclosure as examples, but are not intended to limit the disclosure.

DETAILED DESCRIPTION

In order to make clearer the purpose, technical solutions and advantages of embodiments of the disclosure, embodiments of the disclosure will be described below with reference to the drawings and specific embodiments in detail.

Figure 1:
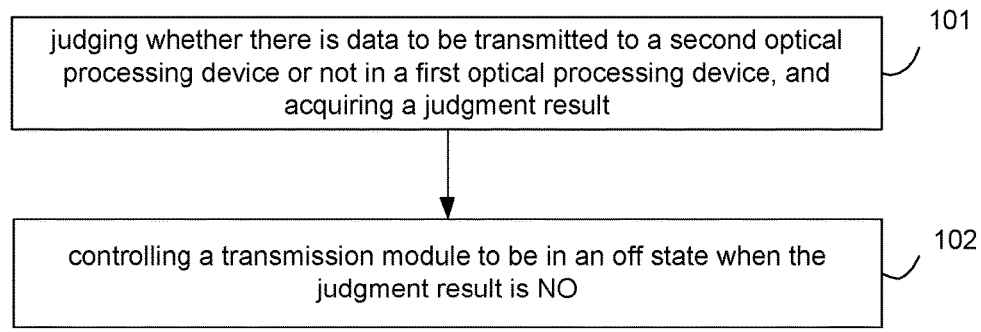
FIG. 1 is a flowchart of a control method according to an embodiment of the disclosure.

FIG. 1 is a flowchart of a control method according to an embodiment of the disclosure. Referring to FIG. 1, the embodiment of the disclosure provides a control method, a first optical processing device is connected with a second optical processing device through an optical port link, and a transmission module configured to transmit a signal to the second optical processing device through the optical port link is arranged on the first optical processing device, the method includes the following steps:

Step 101: judging whether there is data to be transmitted to the second optical processing device or not in the first optical processing device, and acquiring a judgment result; and Step 102: controlling the transmission module to be in an off state when the judgment result is NO.

Obviously, the transmission module is controlled to be in the off state when there is no data to be transmitted to the second optical processing device in the first optical processing device, so that energy consumption of the first optical processing device is reduced.

Wherein, the first optical processing device may, for example, be: an optical transmitter or an optical transceiver.

The transmission module may, for example, be: an optical module on the optical transmitter or an optical module configured to transmit an optical signal on the optical transceiver.

The second optical processing device may, for example, be: an optical receiver or an optical transceiver.

The data may, for example, be: a message.

In an embodiment of the disclosure, the method may further include:

controlling the transmission module to be in an on state so as to enable the transmission module to transmit the data to the second optical processing device when the judgment result is YES.

In addition, in an embodiment of the disclosure, it is necessary to keep a channel for transmitting a signal by the first optical processing device through the optical port link UP to ensure timely and non-destructive transmission of the data, and in view of this, the method may further include:

controlling the transmission module to transmit a first code stream configured to maintain a signal transmission channel on the optical port link to the second optical processing device, and entering step 102 after a timer is set; and at the end of timing of the timer, controlling the transmission module to be switched on, controlling the switched-on transmission module to transmit a second code stream configured to maintain the signal transmission channel to the second optical processing device, and returning to step 101.

Wherein, the first code stream may, for example, be: an I code stream or a C code stream.

The second code stream may, for example, be: an I code stream or a C code stream.

To synchronously maintain the signal transmission channel by the first optical processing device and the second optical processing device when there are no message to be transmitted:

there exists a calculation relationship between a time length of the timer and first delay time, wherein the first delay time is delay time of transmission of the first code stream to the second optical processing device by the transmission module relative to transmission of a third code stream to the second optical processing device by the transmission module, the third code stream is a code stream which is transmitted to the second optical processing device last time before the transmission module transmits the first code stream to the second optical processing device, and the third code stream is configured to establish or maintain the signal transmission channel; and when the second optical processing device does not receive the second code stream within second delay time after receiving the first code stream, the signal transmission channel is set to be unavailable, wherein there exists the calculation relationship between the second delay time and third delay time, and the third delay time is delay time of reception of the first code stream by the second optical processing device relative to reception of the third code stream by the second optical processing device.

Wherein, the third code stream may, for example, be: an I code stream or a C code stream.

The calculation relationship may be an N-fold relationship, wherein N is greater than 1.

In addition, in consideration of the condition that the first optical processing device has a function of receiving data from the second optical processing device:

a receiving module configured to receive a signal transmitted by the second optical processing device through the optical port link is also arranged on the first optical processing device, and the method further includes:

when the receiving module does not receive a code stream configured to maintain a signal receiving channel from the second optical processing device within delay time after receiving a fourth code stream configured to maintain the signal receiving channel on the optical port link from the second optical processing device, controlling a state machine of the signal receiving channel to be in a channel-unavailable state; or, when the receiving module receives a fifth code stream configured to maintain the signal receiving channel on the optical port link from the second optical processing device, controlling the state machine of the signal receiving channel to be in a channel-available state.

Wherein, the receiving module may, for example, be: an optical module configured to receive an optical signal on an optical transceiver.

The fourth code stream may, for example, be: an I code stream or a C code stream.

The fifth code stream may, for example, be: an I code stream or a C code stream.

In order to describe embodiments of the disclosure more clearly, a detailed implementation mode of the embodiment of the disclosure will be provided below.

A main purpose of the implementation mode is to provide a processing method and device for implementing EEE on an optical port transmitter, which may reduce energy consumption of an optical transceiver on the basis of implementing normal and non-destructive message transmission and reception of an optical port link.

The implementation mode discloses a system for reducing energy consumption of an optical transceiver, including the following parts.

A reconciliation layer is added between a switch and an optical module, and is configured to process signal detection in receiving and transmission directions and state machine migration work respectively.

The reconciliation layer in the transmission direction includes:

a TX_FIFO detector: the TX_FIFO detector is configured to detect whether a transmission queue TX_FIFO of the switch is empty or not, wherein it is indicated that there are no messages to be transmitted in the switch if TX_FIFO is empty, and it is indicated that there are messages to be transmitted in the switch if TX_FIFO is nonempty;

a TX_DELAY_TIMER detector: the TX_DELAY_TIMER detector is configured to detect whether an interval period TX_DELAY_TIMER of an I code stream or C code stream transmitted by the optical port link is overtime or not, wherein it is indicated that the interval period has been reached and it is necessary to retransmit the I code stream or the C code stream to opposite equipment if TX_DELAY_TIMER is 0; and a TX low power state machine: the TX low power state machine is configured to analyze results of the two detectors to determine to switch a local optical transmitter between an ordinary mode and a low power mode or keep an original mode unchanged, simultaneously set a TX_DISABLE signal of the optical transmitter and reset an initial value of a decreasing timer TX_DELAY_TIMER.

The reconciliation layer in the receiving direction includes:

an RX_DELAY_TIMER detector: the RX_DELAY_TIMER detector is configured to detect whether an interval period RX_DELAY_TIMER of an I code stream or C code stream received by the optical port link is overtime or not, wherein it is indicated that the interval period has been reached and the optical port link is abnormally disconnected if RX_DELAY_TIMER is 0; and an RX_LINK state machine: the RX_LINK state machine is configured to analyze an analysis result of the detector to determine to switch the current optical port link between an UP state and a DOWN state or keep an original state unchanged, and simultaneously reset an initial value of a decreasing timer RX_DELAY_TIMER.

The implementation mode discloses a processing method for reducing energy consumption of an optical transceiver, which includes the following steps:

when an optical port link is established between equipment at two ends, it is indicated that there are messages to be transmitted if TX_FIFO of a switch is nonempty in an ordinary mode, and an optical transmitter executes transmission work to transmit the messages to the opposite end immediately;

if TX_FIFO is empty, it is indicated that all the messages to be transmitted have been transmitted, a transmitter of the optical port link may enter a low power mode and simultaneously set a TX_DISABLE signal of the optical transmitter to be effective, that is, an optical module of the optical transmitter is set into an off state, so that energy consumption of the optical transmitter is maximally reduced to fulfil the aim of reducing the energy consumption;

the optical port link in the low power mode is still required to be kept UP, that is, an I code stream or a C code stream is stilled required to be periodically transmitted to the opposite end; when a decreasing timer TX_DELAY_TIMER is 0, a system sets the TX_DISABLE signal of the optical transmitter to be ineffective, that is, the optical module of the optical transmitter is set into an on state, and after the I code stream or the C code stream is transmitted, the TX_DISABLE signal of the optical transmitter is set to be effective, the optical port link is still kept in the low power mode, and TX_DELAY_TIMER is reset into an initial value;

the optical port link in the low power mode is still responsible for timely and non-destructive message transmission; when TX_FIFO is nonempty, it is indicated that there are messages to be transmitted, the system sets the TX_DISABLE signal of the optical transmitter to be ineffective, and starts transmitting all the messages to be transmitted of the local equipment until TX_FIFO is empty, and then the optical port link may enter the low power mode again;

under such a condition, a mode of a receiver of the optical port link is the same as an ordinary working mode; the receiver is prepared for receiving messages at any time, and if the receiver does not receive the I code stream or C code stream from the opposite end when RX_DELAY_TIMER is 0, it is indicated that the link has be abnormally disconnected and a port is in a Link DOWN state, otherwise it is necessary to reset a value of a decreasing timer RX_DELAY_TIMER and keep a Link UP state;

in one embodiment, if a non-auto-negotiation mode is adopted when the two ends of the optical port link are in the Link UP state, namely under the condition of transmitting and receiving the I code stream, both TX_DELAY_TIMER and RX_DELAY_TIMER are defaulted to be the same reference time value; and if an auto-negotiation mode is adopted when the two ends of the optical port link are in the Link UP state, namely under the condition of transmitting and receiving the C code stream, the transmitter may set an extensible TX_DELAY_TIMER time value, and transmit the extensible TX_DELAY_TIMER time value to the receiver to synchronize the RX_DELAY_TIMER time value of the receiver through the C code stream.

Figure 2:
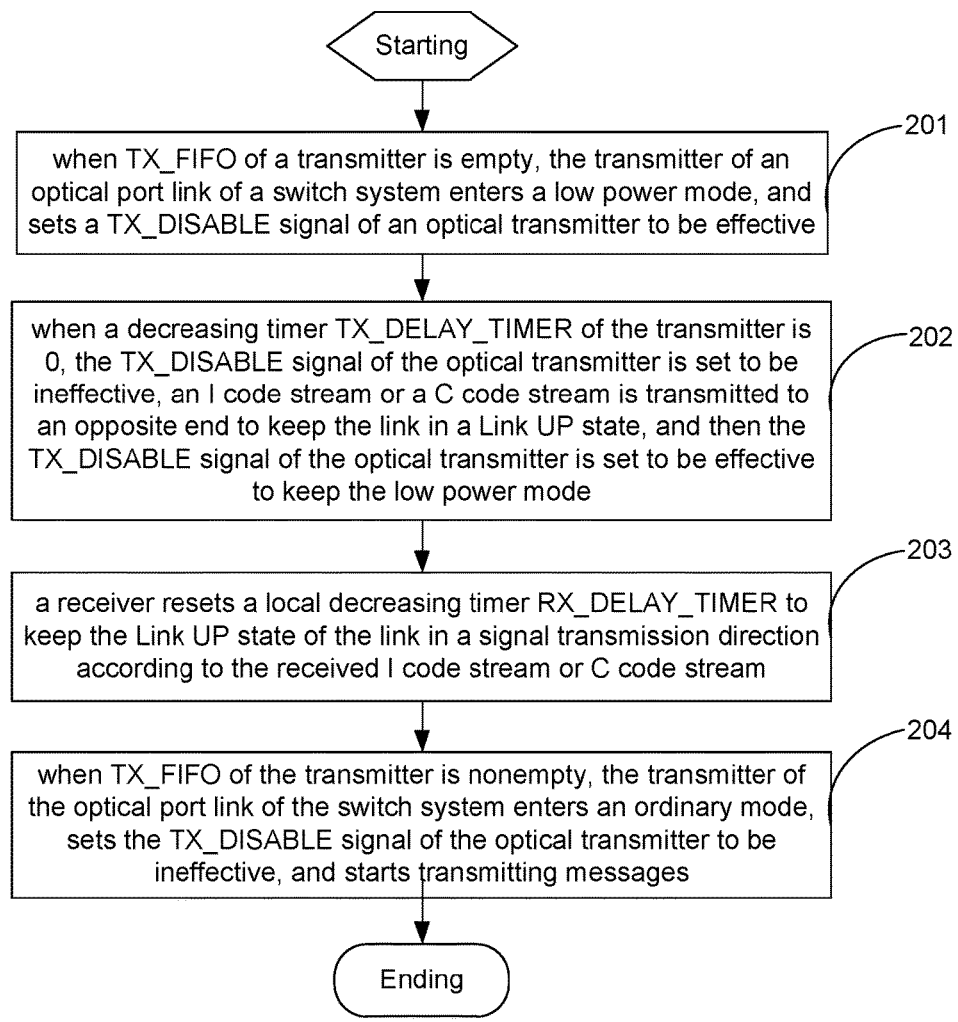
FIG. 2 is a schematic diagram of a processing method for an optical port energy-saving system according to an implementation mode of an embodiment of the disclosure.

FIG. 2 is a schematic diagram of a processing method for an optical port energy-saving system according to the implementation mode. As shown in FIG. 2, the implementation mode discloses an embodiment of a processing method for an optical port energy-saving system, including:

Step 201: when TX_FIFO of a transmitter is empty, the transmitter of an optical port link of a switch system enters a low power mode, and sets a TX_DISABLE signal of an optical transmitter to be effective;

Step 202: when a decreasing timer TX_DELAY_TIMER of the transmitter is 0, the TX_DISABLE signal of the optical transmitter is set to be ineffective, an I code stream or a C code stream is transmitted to an opposite end to keep the link in a Link UP state, and then the TX_DISABLE signal of the optical transmitter is set to be effective to keep the low power mode;

Step 203: a receiver resets a local decreasing timer RX_DELAY_TIMER to keep the Link UP state of the link according to the received I code stream or C code stream; and Step 204: when TX_FIFO of the transmitter is nonempty, the transmitter of the optical port link of the switch system enters an ordinary mode, sets the TX_DISABLE signal of the optical transmitter to be ineffective, and starts transmitting messages.

Figure 3:
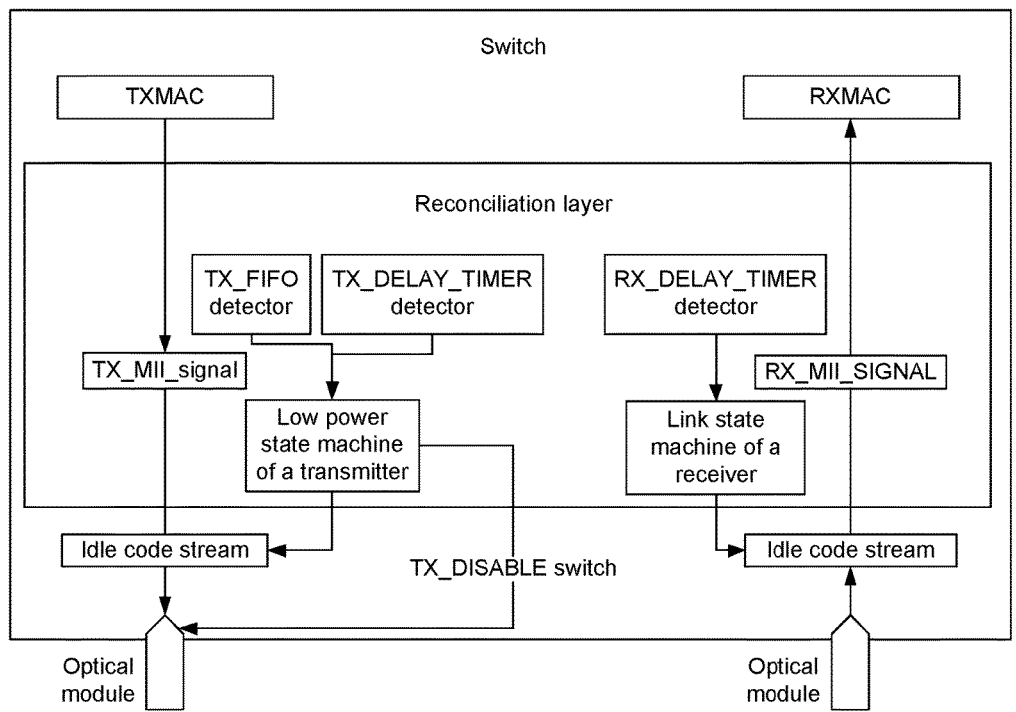
FIG. 3 is a structure diagram of a processing device for an optical port energy-saving system according to an implementation mode of an embodiment of the disclosure.

FIG. 3 is a structure diagram of a processing device for an optical port energy-saving system according to the implementation mode. As shown in FIG. 3, the implementation mode provides a processing device for an optical port energy-saving system.

Figure 4:
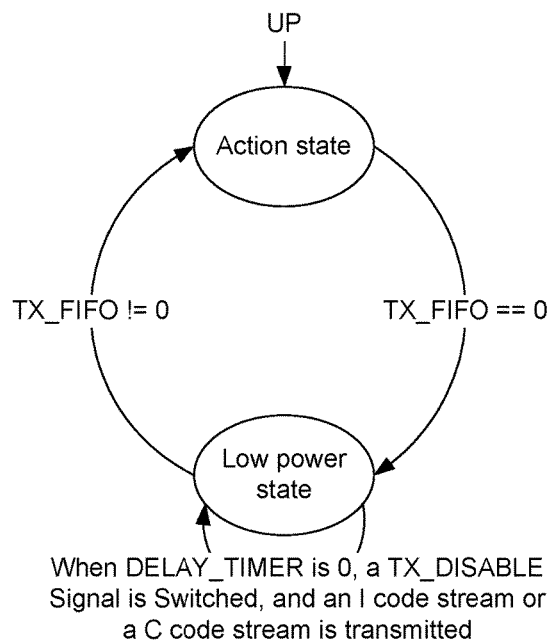
FIG. 4 is a schematic diagram of a TX low power state machine of an optical port energy-saving system according to an implementation mode of an embodiment of the disclosure.

Wherein, FIG. 4 is a schematic diagram of a low power state machine of a transmitter, and whether to enter and quit a low power mode or not is judged according to whether TX_FIFO is empty or not so as to control state switching of the transmitter and set a TX_DISABLE signal of an optical transmitter. When TX_DELAY_TIMER is decreased to 0, it is necessary to reset the TX_DISABLE signal of the optical transmitter, transmit an I code stream or a C code stream to an opposite end, keep a Link UP state of an optical port link and reset local TX_DELAY_TIMER into an initial value. In FIG. 4, action state and low power state are involved.

Figure 5:
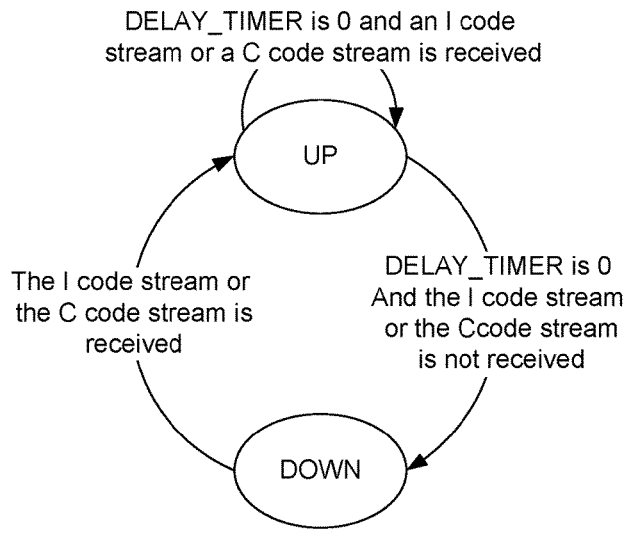
FIG. 5 is a schematic diagram of a link state machine of a receiver of an optical port energy-saving system according to an implementation mode of an embodiment of the disclosure.

Wherein, FIG. 5 is a schematic diagram of a Link state machine of a receiver, and a current Link state is determined according to whether RX_DELAY_TIMER is 0 or not. If the I code stream or the C code stream is not received from the opposite end when RX_DELAY_TIMER is decreased to 0, the current Link state is switched into a Link DOWN state. If the I code stream or the C code stream is received from the opposite end, local RX_DELAY_TIMER is reset into an initial value.

Figure 6:
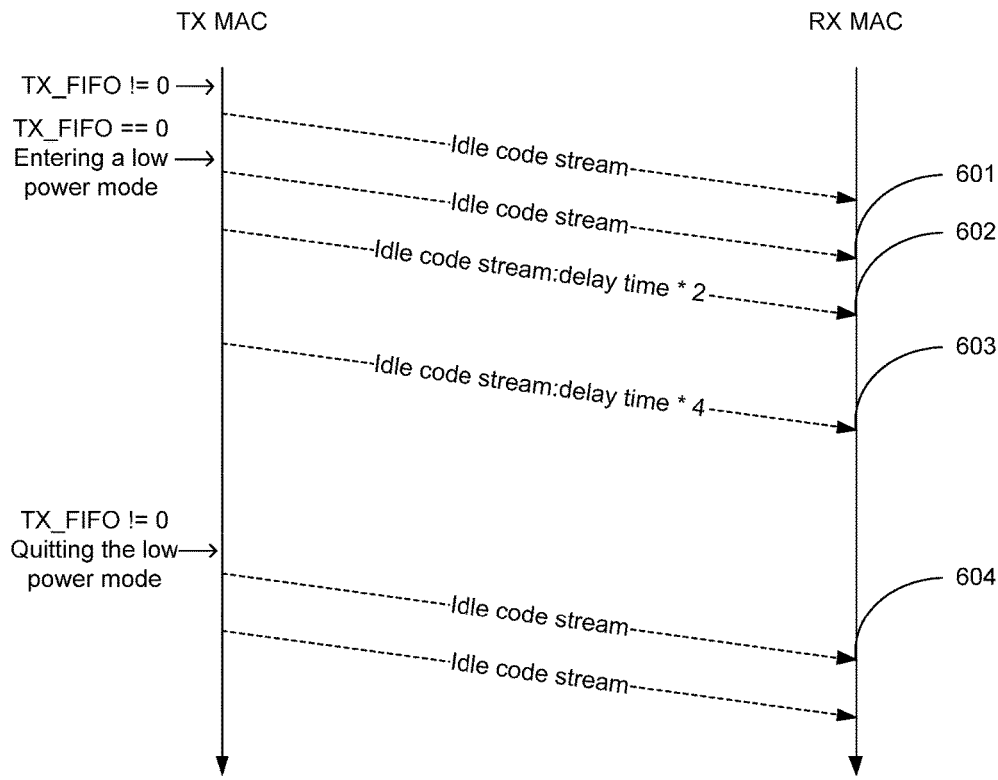
FIG. 6 is a flowchart of synchronization of an optical port energy-saving system according to an implementation mode of an embodiment of the disclosure.

Furthermore, as shown in FIG. 6, time when the I code stream and the C code stream are transmitted to keep the optical port link in the Link UP state is fixed time. If optical ports at both ends support the C code stream with a negotiation parameter, a DELAY_TIME field may be added into the C code stream to implement an extensible synchronization period mechanism, specifically including:

Step 601: when the transmitter enters the low power mode, a synchronization period in a C code stream which is transmitted for the first time is reference DELAY_TIME;

Step 602: within the reference DELAY_TIME, the transmitter is still kept in the low power mode, and a synchronization period in a C code stream which is transmitted for the second time is time which is twice the reference DELAY_TIME;

Step 603: within the time which is twice the reference DELAY_TIME, the transmitter is still kept in the low power mode, and a synchronization period in a C code stream which is transmitted for the third time is time which is four times the reference DELAY_TIME; and Step 604: within the time which is four times the reference DELAY_TIME, the transmitter is switched back to the ordinary mode, and a synchronization period in a C code stream which is transmitted next time is recovered into the reference DELAY_TIME.

In the embodiment, if the transmitter is in the low power mode for a long time, its synchronization period may not be infinitely extended, otherwise the problem that the two ends of the optical port link may not timely respond to a link abnormity may arise. It is suggested that the synchronization period is maximally time which is 16 times the reference DELAY_TIME, and is kept unchanged after reaching the time which is 16 times the reference DELAY_TIME, and the synchronization period in the C code stream is recovered into the reference DELAY_TIME after the transmitter is switched back to the ordinary mode.

From the above, in the processing device embodiment for the optical port link system according to the implementation mode, by virtue of detection and judgment of the low power state machine, the transmitter enters the low power mode in an idle period when there are not messages to be transmitted. In addition, an extensible synchronization period policy is implemented in the C code stream for maintaining the optical port link, so that energy consumption of the optical transmitter is maximally reduced, and the aim of saving energy is fulfilled.

Figure 7:
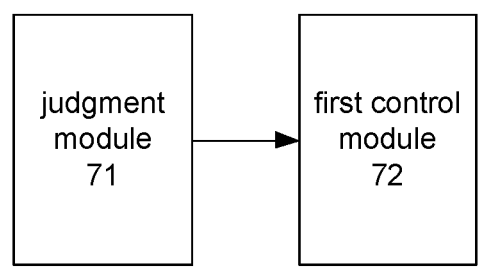
FIG. 7 is a structure diagram of a control device according to an embodiment of the disclosure.

As shown in FIG. 7, an embodiment of the disclosure further provides a control device, a first optical processing device is connected with a second optical processing device through an optical port link, and a transmission module configured to transmit a signal to the second optical processing module through the optical port link is arranged on the first optical processing device, the device includes:

a judgment module 71, configured to judge whether there is data to be transmitted to the second optical processing device or not in the first optical processing device, and acquire a judgment result; and a first control module 72, configured to control the transmission module to be in an off state when the judgment result is NO.

Obviously, the transmission module is controlled to be in the off state when there is no data to be transmitted to the second optical processing device in the first optical processing device, so that energy consumption of the first optical processing device is reduced.

In an embodiment of the disclosure, the device may further include:

a second control module, configured to control the transmission module to be in an on state to enable the transmission module to transmit the data to the second optical processing device when the judgment result is YES.

In addition, the device may further include:

a third control module, configured to control the transmission module to transmit a first code stream configured to maintain a signal transmission channel on the optical port link to the second optical processing device when the judgment result is NO, and trigger the first control module 72 after setting a timer, correspondingly, the first control module 72 is further configured to control the transmission module to be in the off state after being triggered by the third control module; and a fourth control module, configured to, at the end of timing of the timer, control the transmission module to be switched on, control the switched-on transmission module to transmit a second code stream configured to maintain the signal transmission channel to the second optical processing device, and trigger the judgment module 71, correspondingly, the judgment module 71 is further configured to continue judging whether there is the data to be transmitted to the second optical processing device or not in the first optical processing device and acquire a judgment result after being triggered by the fourth control module.

Specifically, there exists a calculation relationship between a time length of the timer and first delay time, wherein the first delay time is delay time of transmission of the first code stream to the second optical processing device by the transmission module relative to transmission of a third code stream to the second optical processing device by the transmission module, the third code stream is a code stream which is transmitted to the second optical processing device last time before the transmission module transmits the first code stream to the second optical processing device, and the third code stream is configured to establish or maintain the signal transmission channel; and when the second optical processing device does not receive the second code stream within second delay time after receiving the first code stream, the signal transmission channel is set to be unavailable, wherein there exists the calculation relationship between the second delay time and third delay time, and the third delay time is delay time of reception of the first code stream by the second optical processing device relative to reception of the third code stream by the second optical processing device.

During a practical application, the judgment module, the first control module, the second control module, the third control module and the fourth control module may be implemented by a Central Processing Unit (CPU), Digital Signal Processor (DSP) or Field-Programmable Gate Array (FPGA) in the control device.

An embodiment of the disclosure further provides an optical transceiver, which may include the abovementioned control device.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one or more flows in the flowcharts and/or one or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the implementation mode of the embodiment of the disclosure, and it should be pointed out that those skilled in the art may also make a plurality of improvements and embellishments without departing from the principle of the embodiment of the disclosure, and these improvements and embellishments shall fall within the scope of protection of the embodiment of the disclosure.

What is claimed is:

1. A control method, a first optical processing device being connected with a second optical processing device through an optical port link, and a transmission module configured to transmit a signal to the second optical processing device through the optical port link being arranged on the first optical processing device, the method comprising:
  judging whether there is data to be transmitted to the second optical processing device or not in the first optical processing device, and acquiring a judgment result;
  when the judgment result is NO, controlling the transmission module to transmit a first code stream configured to maintain a signal transmission channel on the optical port link to the second optical processing device, setting a timer, and controlling the transmission module to be in an off state; and
  at end of timing of the timer, controlling the transmission module to be switched on, controlling the switched-on transmission module to transmit a second code stream configured to maintain the signal transmission channel to the second optical processing device, and continuing judging whether there is the data to be transmitted to the second optical processing device or not in the first optical processing device.

2. The method according to claim 1, further comprising:
controlling the transmission module to be in an on state to enable the transmission module to transmit the data to the second optical processing device when the judgment result is YES.

3. The method according to claim 1, wherein there exists a calculation relationship between a time length of the timer and first delay time, wherein the first delay time is delay time of transmission of the first code stream to the second optical processing device by the transmission module relative to transmission of a third code stream to the second optical processing device by the transmission module, the third code stream is a code stream which is transmitted to the second optical processing device last time before the transmission module transmits the first code stream to the second optical processing device, and the third code stream is configured to establish or maintain the signal transmission channel; and the method further comprising:
when the second optical processing device does not receive the second code stream within second delay time after receiving the first code stream, setting the signal transmission channel to be unavailable, wherein there exists a calculation relationship between the second delay time and third delay time, and the third delay time is delay time of reception of the first code stream by the second optical processing device relative to reception of the third code stream by the second optical processing device.

4. The method according to claim 3, wherein each of the calculation relationships is an N-fold relationship, wherein N is greater than 1.

5. The method according to claim 1, wherein a receiving module configured to receive a signal transmitted by the second optical processing device through the optical port link is also arranged on the first optical processing device; and the method further comprising:
when the receiving module does not receive a code stream configured to maintain a signal receiving channel from the second optical processing device within delay time after receiving a fourth code stream configured to maintain the signal receiving channel on the optical port link from the second optical processing device, controlling a state machine of the signal receiving channel to be in a channel-unavailable state; or,
when the receiving module receives a fifth code stream configured to maintain the signal receiving channel on the optical port link from the second optical processing device, controlling the state machine of the signal receiving channel to be in a channel-available state.

6. A control device, wherein a first optical processing device is connected with a second optical processing device through an optical port link, and a transmission module configured to transmit a signal to the second optical processing device through the optical port link is arranged on the first optical processing device, the device comprising:
a judgment module, configured to judge whether there is data to be transmitted to the second optical processing device or not in the first optical processing device, and acquire a judgment result;
a first control module, configured to control the transmission module to be in an off state when the judgment result is NO;
a third control module, configured to control the transmission module to transmit a first code stream configured to maintain a signal transmission channel on the optical port link to the second optical processing device when the judgment result is NO, and trigger the first control module after setting a timer,
correspondingly, the first control module is further configured to control the transmission module to be in the off state after being triggered by the third control module; and
a fourth control module, configured to, at end of timing of the timer, control the transmission module to be switched on, control the switched-on transmission module to transmit a second code stream configured to maintain the signal transmission channel to the second optical processing device, and trigger the judgment module,
correspondingly, the judgment module is further configured to continue judging whether there is the data to be transmitted to the second optical processing device or not in the first optical processing device and acquire a judgment result after being triggered by the fourth control module.

7. The device according to claim 6, further comprising:
a second control module, configured to control the transmission module to be in an on state to enable the transmission module to transmit the data to the second optical processing device when the judgment result is YES.

8. The device according to claim 6, wherein there exists a calculation relationship between a time length of the timer and first delay time, wherein the first delay time is delay time of transmission of the first code stream to the second optical processing device by the transmission module relative to transmission of a third code stream to the second optical processing device by the transmission module, the third code stream is a code stream which is transmitted to the second optical processing device last time before the transmission module transmits the first code stream to the second optical processing device, and the third code stream is configured to establish or maintain the signal transmission channel; and when the second optical processing device does not receive the second code stream within second delay time after receiving the first code stream, the signal transmission channel is set to be unavailable, wherein there exists a calculation relationship between the second delay time and third delay time, and the third delay time is delay time of reception of the first code stream by the second optical processing device relative to reception of the third code stream by the second optical processing device.

9. An optical transceiver, comprising a control device; wherein a first optical processing device is connected with a second optical processing device through an optical port link, and a transmission module configured to transmit a signal to the second optical processing device through the optical port link is arranged on the first optical processing device, and wherein the control device comprises:
a judgment module, configured to judge whether there is data to be transmitted to the second optical processing device or not in the first optical processing device, and acquire a judgment result;
a first control module, configured to control the transmission module to be in an off state when the judgment result is NO;
a third control module, configured to control the transmission module to transmit a first code stream configured to maintain a signal transmission channel on the optical port link to the second optical processing device when the judgment result is NO, and trigger the first control module after setting a timer, correspondingly, the first control module is further configured to control the transmission module to be in the off state after being triggered by the third control module; and a fourth control module, configured to, at end of timing of the timer, control the transmission module to be switched on, control the switched-on transmission module to transmit a second code stream configured to maintain the signal transmission channel to the second optical processing device, and trigger the judgment module, correspondingly, the judgment module is further configured to continue judging whether there is the data to be transmitted to the second optical processing device or not in the first optical processing device and acquire a judgment result after being triggered by the fourth control module.

10. The optical transceiver according to claim 9, the control device further comprising:

a second control module, configured to control the transmission module to be in an on state to enable the transmission module to transmit the data to the second optical processing device when the judgment result is YES.

11. The optical transceiver according to claim 9, wherein there exists a calculation relationship between a time length of the timer and first delay time, wherein the first delay time is delay time of transmission of the first code stream to the second optical processing device by the transmission module relative to transmission of a third code stream to the second optical processing device by the transmission module, the third code stream is a code stream which is transmitted to the second optical processing device last time before the transmission module transmits the first code stream to the second optical processing device, and the third code stream is configured to establish or maintain the signal transmission channel; and when the second optical processing device does not receive the second code stream within second delay time after receiving the first code stream, the signal transmission channel is set to be unavailable, wherein there exists a calculation relationship between the second delay time and third delay time, and the third delay time is delay time of reception of the first code stream by the second optical processing device relative to reception of the third code stream by the second optical processing device.

12. A non-transitory computer storage medium, comprising a set of instructions and causing at least one processor to execute a control method when the instructions are executed; a first optical processing device being connected with a second optical processing device through an optical port link, and a transmission module configured to transmit a signal to the second optical processing device through the optical port link being arranged on the first optical processing device, the control method comprising:

judging whether there is data to be transmitted to the second optical processing device or not in the first optical processing device, and acquiring a judgment result;

when the judgment result is NO, controlling the transmission module to transmit a first code stream configured to maintain a signal transmission channel on the optical port link to the second optical processing device, setting a timer, and controlling the transmission module to be in an off state; and at end of timing of the timer, controlling the transmission module to be switched on, controlling the switched-on transmission module to transmit a second code stream configured to maintain the signal transmission channel to the second optical processing device, and continuing judging whether there is the data to be transmitted to the second optical processing device or not in the first optical processing device.

13. The non-transitory computer storage medium according to claim 12, the control method further comprising:

controlling the transmission module to be in an on state to enable the transmission module to transmit the data to the second optical processing device when the judgment result is YES.

14. The non-transitory computer storage medium according to claim 12, wherein there exists a calculation relationship between a time length of the timer and first delay time, wherein the first delay time is delay time of transmission of the first code stream to the second optical processing device by the transmission module relative to transmission of a third code stream to the second optical processing device by the transmission module, the third code stream is a code stream which is transmitted to the second optical processing device last time before the transmission module transmits the first code stream to the second optical processing device, and the third code stream is configured to establish or maintain the signal transmission channel; and the control method further comprises:

when the second optical processing device does not receive the second code stream within second delay time after receiving the first code stream, setting the signal transmission channel to be unavailable, wherein there exists a calculation relationship between the second delay time and third delay time, and the third delay time is delay time of reception of the first code stream by the second optical processing device relative to reception of the third code stream by the second optical processing device.

15. The non-transitory computer storage medium according to claim 14, wherein each of the calculation relationships is an N-fold relationship, wherein N is greater than 1.

16. The non-transitory computer storage medium according to claim 12, wherein a receiving module configured to receive a signal transmitted by the second optical processing device through the optical port link is also arranged on the first optical processing device, and the control method further comprises:

when the receiving module does not receive a code stream configured to maintain a signal receiving channel from the second optical processing device within delay time after receiving a fourth code stream configured to maintain the signal receiving channel on the optical port link from the second optical processing device, controlling a state machine of the signal receiving channel to be in a channel-unavailable state; or, when the receiving module receives a fifth code stream configured to maintain the signal receiving channel on the optical port link from the second optical processing device, controlling the state machine of the signal receiving channel to be in a channel-available state.

* * * * *